United States Patent [19]

Osterhold

[11] 4,305,615
[45] Dec. 15, 1981

[54] VEHICLE SEAT BACK MOUNTING

[75] Inventor: Wolfgang Osterhold, Brighton, Mich.

[73] Assignee: Keiper U.S.A., Inc., Battle Creek, Mich.

[21] Appl. No.: 129,831

[22] Filed: Mar. 13, 1980

Related U.S. Application Data

[63] Continuation of Ser. No. 931,306, Mar. 7, 1978, abandoned.

[51] Int. Cl.³ .............................................. B60N 1/02
[52] U.S. Cl. .................................... 297/379; 297/216; 297/362
[58] Field of Search ............... 297/216, 379, 378, 373, 297/354, 362; 16/139, 146

[56] References Cited

U.S. PATENT DOCUMENTS

| 2,873,794 | 2/1959 | Leslie et al. | 297/379 |
| 3,674,309 | 7/1972 | Fowler | 297/379 |
| 4,010,979 | 3/1977 | Fisher et al. | 297/379 |
| 4,082,353 | 4/1978 | Hollowell | 297/379 |
| 4,103,967 | 8/1978 | Tanaka et al. | 297/379 X |
| 4,118,067 | 10/1978 | Tanaka | 297/379 |

FOREIGN PATENT DOCUMENTS

| 2514819 | 10/1976 | Fed. Rep. of Germany | 297/379 |
| 2641587 | 3/1978 | Fed. Rep. of Germany | 297/379 |
| 2655535 | 6/1978 | Fed. Rep. of Germany | 297/379 |

Primary Examiner—William E. Lyddane

[57] ABSTRACT

A vehicle seat back mounting having a latch pivotably mounted for a limited swinging movement with a recessed catch shaped for engaging a projection on the stationary seat part to prevent forward tilting. The center of gravity of the latch is located laterally and below the pivot point so that during manual tilting of the seat back the force of gravity releases the latch from the projection; and so that during sudden deceleration of the vehicle an inertial force counteracts the force of gravity and prevents unlatching.

7 Claims, 5 Drawing Figures

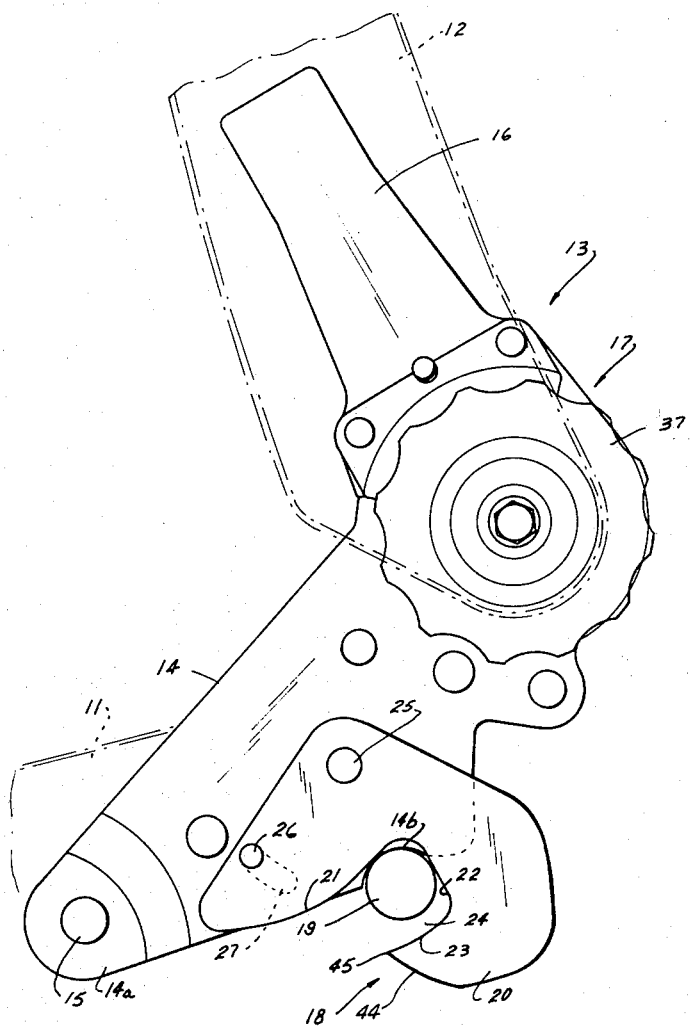

VEHICLE SEAT BACK MOUNTING

REFERENCE TO RELATED APPLICATION

This application is a continuation of my co-pending U.S. application Ser. No. 931,306 filed Mar. 7, 1978 for "A Vehicle Seat With An Inertially Activated Arresting Arrangement for the Back Rest Component" abandoned upon filing the present application.

BACKGROUND OF THE INVENTION

The present invention is related to a seat for use in a vehicle in general, and particularly to a seat to be used in a motor vehicle.

Vehicle seats of various constructions are already known, as are hinges of different constructions which mount the rear component of the vehicle seat on the rear region of the seat component of the seat for tilting at least frontwardly from at least one erect position to a frontwardly collapsed position and back. Then, it is also known to equip the hinges of the hinge arrangement with a fine-adjustment arrangement which enables the user of the seat to select an erect position which is most comfortable or convenient to the user.

Under many circumstances, particularly in a two-door passenger car or in a three-door stationwagon, it is desirable or even mandatory that the back rest component of the front seat of the vehicle be tiltable frontwardly into a collapsed position thereof in order to provide access to the rear part of the passenger compartment of the vehicle, and especially to enable rear-seat passengers to ingress and egress the rear part of the passenger compartment. In this situation, it is desired that the back component of the vehicle seat be releasable for the frontward tilting in a simple, quick and otherwise convenient way, in order not to unduly inconvenience either the front-seat or the rear-seat passengers of the vehicle.

However, another requirement which is to be satisfied under these circumstances is that the latching arrangement which arrests the back component in its erect position be safe, that is, that it reliably maintain the back component in its permanent or selected erect position in the event of a sudden deceleration of the vehicle, particularly in the event of a frontal collision of the vehicle. This is not only desired, but in many countries even mandated by statutes, in order to reduce the likelihood of a serious injury both to the front-seat and the rear-seat passengers of the vehicle. As to the rear-seat passengers, a natural tendency in the event of a sudden deceleration of the vehicle would be to brace against the back component of the front seat and, if the arresting arrangement did not securely retain the back component in place, the back component would yield frontwardly under the force exerted thereupon by the rear-seat passenger, and thus not perform the supporting function expected from it by the rear-seat passenger. On the other hand, as to the driver or the front-seat passenger, the yielding of the back component in the frontward direction would trap him or her between the back component and the dashboard or steering wheel and act on him or her with an inertia-based force, possibly aggravated by the force exerted on the back component by the rear-seat passenger, which force or forces could cause additional, or aggravate anyway occurring to injuries suffered by the driver or the front-seat passenger.

In order to satisfy the above requirement, the conventional arresting arrangements for the back component are usually so constructed that they require a voluntary action on part of the driver or of the passenger for releasing the same. So, for instance, at least some of the conventional arresting arrangements include a release button or lever located at the top portion of the respective front seat of the vehicle, which can be displaced by the driver or the passenger of the vehicle into a position in which the arresting arrangement, which is connected to the releasing button or lever, for instance, by a Bowden cable, is moved from its arresting position, into which it is permanently urged, into a releasing position in which it releases the back component of the seat for free tilting toward a frontwardly collapsed position and back. However, it will be appreciated that, because of the need for actuating the release button or lever preparatorily to the frontward tilting of the back component of the vehicle seat, this conventional arresting arrangement for the back component of the seat is less than fully satisfactory.

SUMMARY OF THE INVENTION

Accordingly, it is a general object of the present invention to avoid the disadvantages of the prior art.

More particularly, it is an object of the present invention to provide an arrangement for arresting the back component of the vehicle seat which is not possessed of the disadvantages of the prior-art arrangements of this type.

Still another object of the present invention is to so construct the arresting arrangement of this type as not to require any actuation of the arresting arrangement by the driver or the passenger of the vehicle for releasing the back component of the seat towards its frontwardly collapsed position.

It is a further object of the present invention to so design the arresting arrangement as to safely retain the back component in its permanent or selected erect position in the event of a sudden deceleration, nevertheless.

A concomitant object of the present invention is to develop an arresting arrangement which is simple in construction, inexpensive to manufacture and reliable in operation.

In pursuance of these objects and others which will become apparent hereafter, one feature of the present invention resides in a seat for a vehicle, particularly in a motor vehicle, which comprises, in combination, a seat component having a front and a rear region; a back component mounted at the rear region of the seat component for frontward and rearward tilting between an erect and a frontwardly collapsed position; and inertially activated means for arresting the back component in the erect position thereof during a sudden deceleration of the vehicle. As a result of the utilization of inertia for activating the arresting means, there is obtained a safe retention of the back component in its erect position while the back component is free to tilt between the erect position and the frontwardly collapsed position in the absence of the action of any inertial forces on the arresting arrangement.

According to a currently preferred aspect of the present invention, the inertially activated arresting means includes two elements having respective contact surfaces, one of these elements being positionally fixed with respect to one of the components, and the other of the elements being so guided for movement relative to the other of the components between releasing and an arresting position that inertial forces acting on the other element during the sudden deceleration urge the same into the arresting position in which the contact surfaces of the elements engage each other, when the back component is in the erect position thereof. Advantageously, a first of these elements is a latching element having a recess bounded by one of the contact surfaces, while a second of these elements is a blocking element including a blocking portion having the other of the contact surfaces and received in the recess of the latching element at least in the arresting position. Then it is advantageous when the latching element is so configured that the receiving recess thereof faces the blocking portion of the blocking element in the releasing position and intermediate the same and the arresting position of the other element, and in the frontwardly collapsed position of the back component.

A particularly advantageous construction of the arresting means of the present invention is obtained when the inertially activated arresting means further includes means for supporting the other of the above-mentioned elements on the other of the seat and back components for pivoting about an axis which is located at a different elevation than the center of gravity of the other element at least when the back component is in the erect position thereof. Under these circumstances, it is particularly advantageous when the one element is so weighted with respect to the pivot axis that gravitational forces acting thereon urge the latching element toward the releasing position thereof.

A particularly simple and advantageous construction of the inertially activated arresting means is obtained when the blocking element is affixed to the seat component and when the supporting means includes a pivot which pivotally mounts the latching element on the back component and is centered on the pivot axis. Then, it is currently preferred when the latching element is so configured that the center of gravity thereof is located downwardly from the pivot axis in the erect position of the back component. With this configuration a synergestic benefit arises from the static inertia of the center of gravity acting on a moment arm extending to the pivot axis of the latching element supplementing the releasing moment of gravity with an effective torque proportional to and increasing with suddenness of manually initiated forward seat back tilting when the vehicle is stationary.

Particularly advantageous results in terms of simplicity of construction are obtained when the back component includes a back rest and at least one hinge having one portion rigidly connected to the back rest and another portion connected to the one portion and articulated to the seat component, the pivot mounting the latching element on the other portion of the hinge. The hinge may advantageously include one hinge member having the above-mentioned portion and another hinge member having the above-mentioned other portion, the hinge members being connected to one another for relative angular displacement for selective adjustment of the erect position of the back rest relative to the seat component.

It is further advantageous when the latching element includes a latch and an actuating portion which is affixed to the latch and extends beyond the same, the actuating portion being freely accessible to enable a user of the seat to pivot the latching element at least toward the releasing position thereof. Under these circumstances, it is further advantageous when the latching element has a guiding zone, and the other portion of the hinge has a confining zone, one of these zones having an elongated arcuate aperture therein which is centered on the pivot axis, and the other of the zones having an extension thereon which is received in the aperture and guided therein during the pivoting of the latching element about the pivot axis. Then, it is especially advantageous when the aperture is present in the confining zone and when the latching element has a pin which is rigidly connected to the latch and has the actuating portion and the extension which have been mentioned above.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 4 is a sectional view taken on line IV—IV of FIG. 3; and

FIG. 5 is a sectional view taken on line V—V of FIG. 3.

DETAILED DISCUSSION OF THE PREFERRED EMBODIMENT

Figure 1:
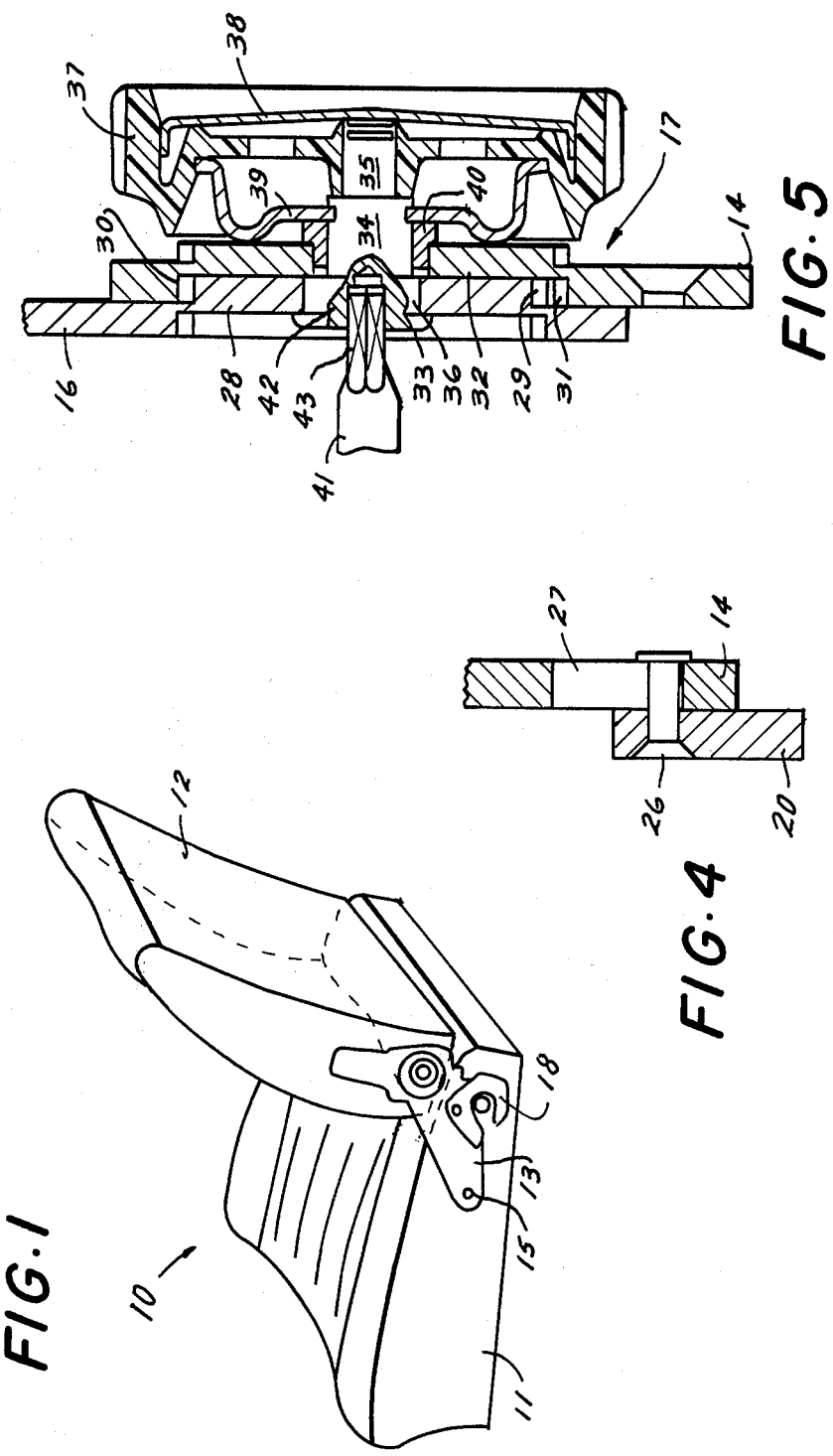
FIG. 1 is a somewhat diagrammatic perspective view of a seat equipped with an arresting arrangement according to the invention.

Referring now to the drawing in detail, and first to FIG. 1 thereof, it may be seen that the reference numeral 10 has been used to designate the seat of a vehicle, particularly a motor vehicle, such as a two-door passenger car, in toto. The seat 10 includes a seat component 11 and a back component 12 which are connected to one another by a hinge 13 at each side of the seat 10. The hinges 13, of which only has been illustrated in FIG. 1, can be connected to one another in a non-illustrated conventional manner, and mount the back component 12 on the seat component 11, for pivoting about a pivot 15. As also illustrated in a simplified fashion in FIG. 1, an arresting arrangement 18 is provided at the hinge 13 between the components 11 and 12 of the seat 10.

Figure 2:
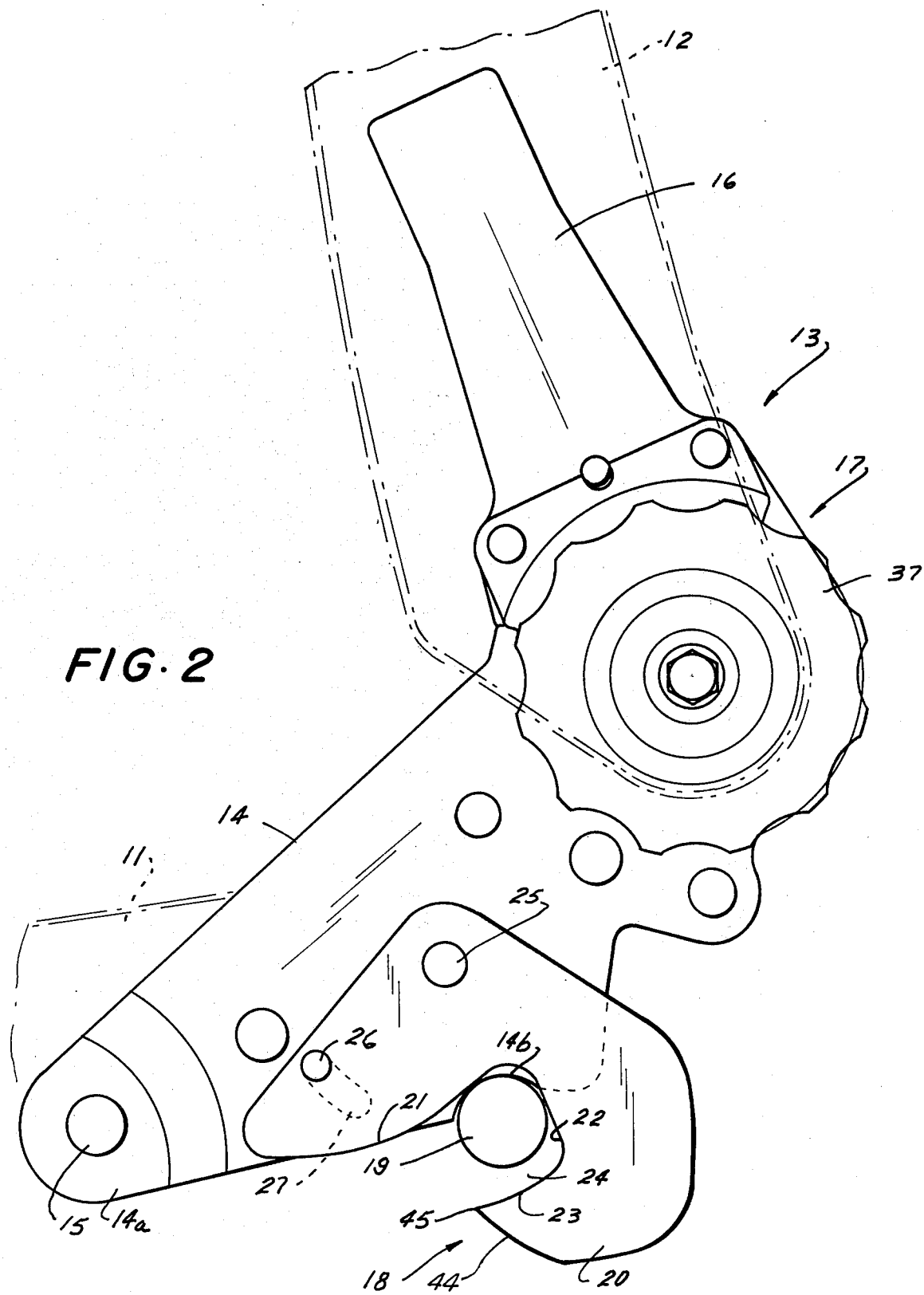
FIG. 2 is a side elevational view of a hinge which is equipped with the arresting arrangement of the present invention, in an erect position of the back component.

Referring now to FIG. 2, it may be seen therein that the hinge 13 includes a hinge member 14 having an offset portion 14a which is mounted on the pivot 15 for pivoting thereabout, and a hinge member 16 which is connected to the back component 12 in any conventional, and hence non-illustrated manner, such as, for instance, by being welded thereto. A fine-adjustment mechanism 17, which will be discussed in some detail later on, connects the hinge members 14 and 16 to one another for adjustment of the relative position of the hinge members 14 and 16 with respect to one another, for selecting the desired erect position of the back component 12.

The arresting arrangement 18 which, as will be explained below, is both inertially and gravitationally operated, includes a projection 19 which is rigid with the seat component 11, and a latching element 20 which has contact surfaces 21, 22 and 23 which together bound a recess 24 in the latching element 20 that receives the projection 19 of the seat component 11 in the illustrated erect position of the back component 12. The latching element 20 further has an additional contact surface 44 which adjoins the contact surface 23 of a tip 45 which is preferably rounded. The purpose of the additional contact surface 44 will be explained later.

The latching element 20 is mounted on the hinge member 14 for free pivoting relative thereto, by means of a pivot 25 which is so positioned that the center of gravity of the latching element 20 is located lower than the pivot axis of the pivot 25. The latching element 20 is further provided with a pin 26, while the hinge member 14 is provided with an elongated arcuate slot 27 centered on the pivot axis of the pivot 25 and receiving the pin 26, as particularly seen in FIG. 4.

Figure 3:
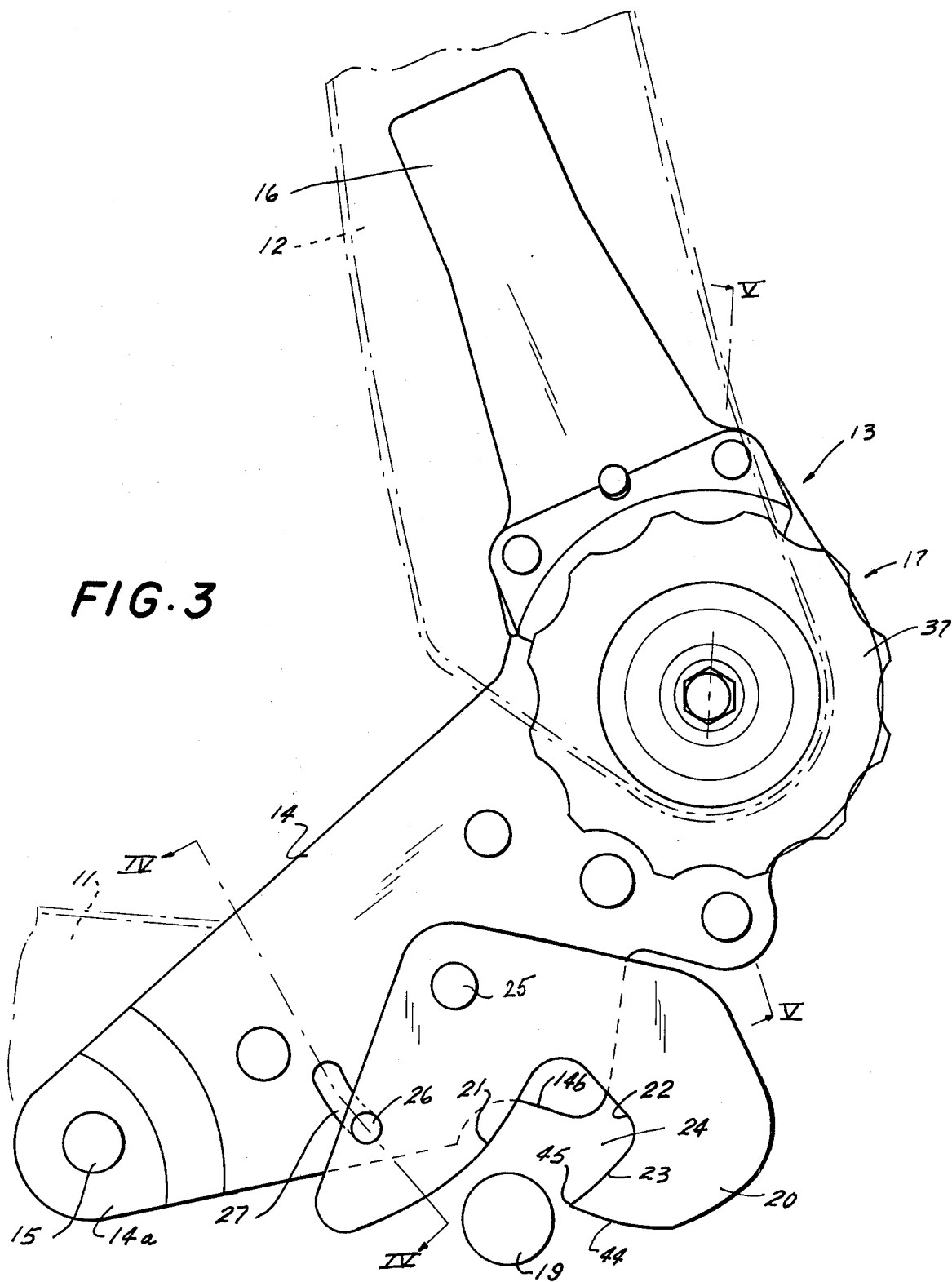
FIG. 3 is a view similar to FIG. 2 but in an at least partially frontwardly tilted position of the back component of the seat.

The slot 27 has such a length as to limit the extent of displacement of the pin 26, and thus of the latching element 20, relative to the hinge member 14 to generally between the positions illustrated in FIGS. 2 and 3, respectively. However, in the position of the hinge 13 illustrated in FIG. 3, or even more displaced in the counterclockwise direction, the latching element 20, because of its freely pivotable mounting on the hinge member 14 by means of the pivot 25, need not necessarily assume the position relative to the hinge member 14 illustrated in FIG. 3. Rather, the latching element 20 could assume any position within the range permitted by the slot 27, in the extreme situation, even that corresponding to its position illustrated in FIG. 2. When this happens, the projection 19 of the seat component 11 will be juxtaposed with the tip 45 and/or the additional contact surface 44, as the case may be, rathr than with the recess 24 of the latching element 20.

It may also be seen in FIG. 2, and even more clearly in FIG. 3, that the hinge member 14 has a surface 14b which bounds a recess in the hinge member 14 which, in the erect position of the back component 12, receives the projection 19 of the seat component 11, the surface 14b supporting the hinge component 14, and thus the entire hinge 13 and the back component 12 in the erect position of the latter.

When the back component is in its erect position illustrated in FIG. 2, depending on the particular configuration of the recess 24 of the latching element 20 and the manufacturing tolerances encountered with respect to the position of the pivot 25 and the projection 19, the latter will be in contact with at least one of the supporting contact surfaces 21, 22 and 23 of the latching element 20. Now, should the vehicle, and thus the latching element 20, be subjected to a sudden deceleration, such as during abrupt braking of the vehicle or during a frontal or similar collision of the vehicle, the inertial forces which, in the final analysis, act on the latching element 20 in its center of gravity, will urge the latching element 20 frontwardly, that is clockwise as seen in FIG. 2. Under these circumstances, the arresting contact, surfaces 22 and 23 of the latching element 20 will contact and press against the projection 19 which, because of its rigid connection to the seat component 11, is stationary relative to the vehicle, so that the latching element 20 will be unable to pivot about the pivot axis of the pivot 25 in the counterclockwise direction, that is, towards its releasing position. Advantageously, the contact surface 23 is so configured as to be, for instance, centered on the pivot axis of the pivot 25, or that the line along which action and reaction forces act between the contact surface 23 and the projection 19 either passes through the pivot axis of the pivot 25, or bypasses it to the right therefrom, or even slightly to the left therefrom, but still within the frictional angle. As a result of this, the latching element will safely remain in its arresting position illustrated in FIG. 2 during the sudden deceleration of the vehicle, and thus will prevent the hinge 13 and, with it, also the back component 12 of the seat 10, from tilting about the pivot 15 in the counterclockwise direction, that is, toward the frontwardly collapsed position of the back component 12.

On the other hand, in the absence of the deceleration-caused inertial forces, the latching element 20, which is so weighted that the gravitational forces acting thereon tend to pivot it in the counterclockwise direction about the pivot axis of the pivot 25, would pivot toward its releasing position illustrated in FIG. 3, were it not for the fact that the contact surface 21 contacts the projection 19 of the seat component 11 in the erect position of the back component 12 illustrated in FIG. 2. However, precisely because of the above-mentioned weighting of the latching element 20, once a user of the vehicle, be it the driver, the front-seat passenger or one of the rear-seat passengers of the vehicle, displaces the back component 12 towards its position illustrated in FIG. 3, the latching element 20 will pivot about the pivot axis of the pivot 25 in the counterclockwise direction, while the contact surface 21 of the latching element 20 remains in contact with the projection 19. Eventually, however, the latching element 20 will assume its equilibrium position illustrated in FIG. 3 in which the contact surface 21 of the latching element 20 is out of contact with the projection 19, but the recess 24 of the latching element 20 opens toward the projection 19. Two force components are effective to produce the foregoing counterclockwise release movement of the latching element in response to manually initiated forward displacement of the back 12: (1) a gravity component acting on a moment arm equal to the horizontal displacement of the center of gravity from the axis of pivot 25, and (25) a static inertia component acting on a greater moment arm extending from the center of gravity to the pivot axis which is proportional to and increasing with the suddenness of seat back displacement thus making it difficult if not impossible to "beat" the latch release by sudden forward seat back tilting which imposes a positive angular drive of the pivot 25 about the axis of pivot 15 with static inertia resisting like movement of the center of gravity and thereby producing an effective unlatching couple supplementing the gravity component which is constant regardless of any rate of forward tilting. In this connection, it is to be mentioned that, in the illustrated embodiment of the present invention the weight of the pin 26 significantly contributes to the above-mentioned weighting of the latching element 20; however, it will be appreciated that the latching element 20 could be so configured as to achieve this weighting in the absence of the provision of the pin 26, for instance by making the latching element 20 thicker to the left of the vertical plane passing through the pivot axis of the pivot 25 than to the right of this plane, or be extending the latching element 20 more to the left than illustrated but at the same or even at a different thickness.

Now, when the back component 12 of the seat 10 is displaced from the position illustrated in FIG. 3, toward or into the position illustrated in FIG. 2, one of the contact surfaces 21, 22 and 23, and most likely the contact surface 21 of the latching element 20, will contact the projection 19 of the seat component 11, whereupon the cooperation of the contact surfaces 21, 22 and 23 with the projection 19 will pivot the latching element 20 about the pivot axis of the pivot 25 in the clockwise direction, until the situation illustrated in FIG. 2 is obtained again.

On the other hand, should the tip 45 or even the additional contact surface 44 of the latching element 20, rather than the recess 24, be juxtaposed with the projection 19 of the seat component 11, for whatever reason, in the position of the hinge illustrated in FIG. 3, the additional contact surface 44 will slide along the projection 19 during the movement of the hinge 13 toward the position of FIG. 2, thus pivoting the latching element 20 in the counterclockwise direction until the tip 45 clears the projection 19 and the latter fully enters the recess 24 of the latching element 20. Of course, the additional contact surface 44 is so configurated that this counterclockwise pivoting will indeed take place, and has such a length that it will contact the projection 19 even when the latching element 20 is initially displaced clockwise to the utmost extent permitted by the engagement of the pin 26 in the arcuate slot 27. Once the tip 45 of the latching element 20 clears the projection 19 and the latter enters the recess 24 the latching element 20 will be rotated in the clockwise direction again, similarly to what has been discussed above, due to the engagement of the contact surface 21 with the projection 19, until the position of FIG. 2 is reached.

As may be particularly clearly ascertained from FIG. 4, the mounting portion 14a of the hinge member 14 which is supported on the pivot 15, is offset laterally out of the general plane of the hinge member 14. In this manner, it is assured that the hinge member 14 will be able to move past the seat component 11 without interfering therewith.

Turning now to FIG. 5, it may be seen therein that the above-mentioned fine adjustment mechanism 17, which connects the hinge members 14 and 16 to one another for adjustment of the desired erect position of the back component includes, as is conventional, a gear portion 28 of the hinge member 16 which has an external annulus of teeth 29, and another gear portion 30 of the hinge member 14 which surrounds the gear portion 28 of the hinge member 16 and has an internal annulus of teeth 31 which mesh with the teeth 29 of the gear portion 28 of the hinge member 16. It is preferred when the number of the teeth 29 is smaller by only one than the number of the teeth 31, as a result of which the teeth 29 and 31, while being capable of meshing with one another, will do so in a self-locking manner. In other words, the friction between the teeth 29 and 31 while meshing will be such that the hinge member 16 will be safely locked in position with respect to the hinge member 14, unless the user of the seat actuates a hand-wheel 37 or a similar actuator. The hinge member 14 has a further portion 32 which is laterally offset with respect to the other gear portion 30 and adjoins the gear portion 28.

A pivot 33 connects the portion 32 of the hinge member 14 to the gear portion 28 of the hinge member 16. The pivot 33 includes two mounting portions 34 and 35 which are centered on a common axis, and an eccentric portion 36 which is centered on an eccentric axis which is offset from the common axis of the mounting portions 34 and 35. The hand-wheel 37 is mounted on the mounting portion 35 and retained thereon by means of a securing ring 38. A bracket 39 is connected to the hand-wheel 37 and is mounted on the mounting portion 34 of the pivot 33. A mounting sleeve 40 mounts the portion 32 of the hinge member 14 on the mounting portion 34 of the pivot 33. On the other hand, the gear portion 28 of the hinge member 16 is mounted on the eccentric portion 36 of the pivot 33 so that, when the hand-wheel 37 and thus the pivot 33 is rotated about the common axis of the mounting portions 34 and 35, the eccentric axis of the eccentric portion 36, and with it also the gear portion 28 of the hinge member 16, will orbit about the common axis of the mounting portions 34 and 35 of the pivot 33 and thus the gear portion 28 of the hinge member 16 will conduct a spatial movement about the common axis of the mounting portions 34 and 35, during which different teeth 29 and 31 will engage one another. In other words, when the pivot 33 is rotated through one full revolution, the gears 28 and 30 will become relative to one another by one tooth distance, provided that the number of the teeth 29 and 31 indeed differs by one, as mentioned previously. Thus, the hinge member 16 will become displaced or finely adjusted with respect to the hinge member 14 by an angle corresponding to the angular spacing between the teeth 29.

As may also be ascertained from FIG. 5, a shaft 41 can be connected to the pivot 33 for joint rotation therewith about the common axis of the mounting portions 34 and 35, for instance, as illustrated, by providing the pivot 33 with a recess 42 of a non-circular cross-section and by forming the shaft 41 with a compatibly configurated non-circular end portion 43 which is received in the non-circular recess 42 of the pivot 33. The shaft 41 then connects the two hinges each of which is arranged at one side of the seat 10, for simultaneous and concurrent movement so that both of the hinges 13 behave in the same manner in response to the rotation of the hand-wheel 37.

It will be understood that each of the elements described above, or two or more together, may also find a useful application in other types of constructions, differing from the types described above.

While the invention has been illustrated and described as embodied in an arrangement for arresting the back component of a seat of a two-door passenger car in its erect position, it is not intended to be limited to the details shown, since various modifications and structural changes may be made without departing in any way from the spirit of the present invention.

So, for instance, the hinge could have a different construction, and the latching element and the projection cooperating therewith could be positioned differently on the seat, so long as it is assured that the inertial forces will urge the latching element towards its arresting position. Also a similar concept could be used in seats for use in railway cars, buses, trucks or airplanes.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pivotal seat back mounting for use in a vehicle seat having a forwardly tiltable back to facilitate rear seat passenger entry and exit, comprising spaced angularly fixed pivot and latch engageable means adapted for fixed attachment to an untilting seat component, back mounting means pivotally engaging said pivot means for movement between normally erect and forwardly collapsed back positions, latch means pivotally mounted on said back mounting means movable between normal back erect latching and forward tilting positions, said latch means having a center of gravity vertically and horizontally spaced from its pivotal center to provide a gravity actuated latch release couple on said latching means when said seat back is manually tilted forward, to provide a predominant inertial activated latch retention force on said latch means during sudden deceleration of the vehicle, and to provide an inertia actuated supplemental release couple increasingly responsive to increasingly sudden manually initiated forward seat back movement when the vehicle is stationary.

2. A seat back mounting as defined in claim 1 wherein said latch means includes means responsive to return movement of said back from forward tilting to erect position for overcoming said gravity release actuating couple and returning said latch means to its normal back erect latching position.

3. A seat back mounting as defined in claim 1 including an open hook form of latch means having an opening accommodating gravity actuated release movement of said latch means responsive to intial forward manual tilting of said back, and cam means responsive to return movement of said back to erect position overcoming said gravity release actuating couple and returning said latch means to its normal back erect latching position.

4. A seat back mounting as defined in claim 3 including means for limiting the pivotal movement of said latch means between extremities required for engagement and release of said latch engageable means, said hook form including a cam surface engageable with a fixed surface upon return movement of said back from a forwardly tilting position to assure any necessary release movement of said latch means to accommodate seat back return to erect position and latch return to latch engaging position.

5. A seat back mounting as defined in claim 3 wherein said hook form includes latch engagement clearance sufficient to accommodate initial forward tilting of said back accompanied by gravity actuated pivotal release movement of said latch means.

6. A seat back mounting as defined in claim 1 wherein said back mounting means includes pivotally connected primary and secondary bracket means, said primary bracket means providing said pivotal connections with said seat pivot and said latch means, and said secondary bracket means providing for rigid attachment to said seat back, and means for adjusting the angular relationship of said primary and secondary bracket means together with the angle of said seat back without changing the seat back erect position of said primary bracket means.

7. A seat back mounting as defined in claim 6 including a stop surface on said primary bracket means engageable with said latch engageable means to establish the erect position of said primary bracket means independently of the adjusted position of said secondary bracket means.

* * * * *

UNITED STATES PATENT AND TRADEMARK OFFICE
CERTIFICATE OF CORRECTION

PATENT NO. : 4,305,615
DATED : December 15, 1981
INVENTOR(S) : Wolfgang Osterhold It is certified that error appears in the above—identified patent and that said Letters Patent is hereby corrected as shown below:

Column 6, line 41, "(25)" should read -- (2) --.

Signed and Sealed this

Sixth Day of July 1982

[SEAL]

Attest:

Attesting Officer

GERALD J. MOSSINGHOFF

Commissioner of Patents and Trademarks